United States Patent

[11] 3,633,638

[72] Inventors Frank R. Groves
P.O. Box 267, Milan, Ga. 31060;
Ralph A. Denard, P.O. Box 548,
Washington, Ga. 30673
[21] Appl. No. 884,631
[22] Filed Dec. 12, 1969
[45] Patented Jan. 11, 1972

[54] TREE SHEAR AND DELIMBER
8 Claims, 6 Drawing Figs.
[52] U.S. Cl. .................................................. 144/3 D, 144/2 Z
[51] Int. Cl. ..................................................... A01g 23/02
[50] Field of Search ........................................... 144/2 Z, 3 D, 34 R, 309 AC

[56] References Cited
UNITED STATES PATENTS
3,059,677 10/1962 Busch et al. .................. 144/34
3,308,861 3/1967 Hamilton ...................... 144/3
3,382,899 5/1968 White .......................... 144/34
3,464,468 9/1969 Thompson et al. ............ 144/3

3,498,350 3/1970 Maradyn ...................... 144/309
FOREIGN PATENTS
159,019 5/1962 U.S.S.R. ...................... 144/2 Z Primary Examiner—Gerald A. Dost
Attorney—Jones & Thomas ABSTRACT: A tree shear and delimber for harvesting trees comprising a self-contained wheeled vehicle with a power-operated tree-severing means pivotally mounted on a normally horizontal axis at one end of the vehicle for severing a standing tree with a horizontal cut at one side of the vehicle and for severing a fallen tree into sections with a vertical cut, and power-operated delimbing means mounted on the other end of the vehicle. The delimbing means comprises a pair of generally open L-shaped cutting blades moveable with respect to each other into surrounding relationship about the trunk of a tree, and a pair of power-operated tree-feeding spindles moveable into engagement with opposite sides of the tree trunk to draw the tree through the generally L-shaped blades and remove the limbs from the tree. The severing means at the other end of the vehicle also operates to sever the trunk into sections as it is drawn through the L-shaped cutting blades.

PATENTED JAN 11 1972 3,633,638

INVENTORS
FRANK R. GROVES
RALPH A. DENARD

BY *Jones & Thomas*

ATTORNEYS

TREE SHEAR AND DELIMBER

BACKGROUND OF THE INVENTION

With the high and increasing costs of labor, it has become more and more expensive to harvest timber. The harvesting process requires that the trees be cut adjacent to the ground, the limbs severed from the trees, and in some cases, the trunks of the tree be cut into sections. The trunks or severed sections of the trunks are then usually loaded onto a truck and hauled to a central collection point, such as a railroad. While various power-operated equipment, including power saws, have come into common use in the harvesting process, the operation of the power equipment together with the various manual procedures still require a relatively large labor force. One of the more time-consuming procedures is that of delimbing a tree or cutting away the limbs from the trunk of a tree. Since trees usually have a large number of limbs, and since the limbs usually extend at random from the trunk of the tree, the delimbing operation has been performed by a laborer operating a saw, either a hand saw or a hand-carried power saw. The laborer must cut each limb individually, and since the tree is usually fallen before the delimbing operation, the laborer must orient the saw to the various positions to properly delimb the tree, and occasionally roll the tree to gain access to the limbs between the trunk and the ground.

While the use of hand-carried power saws has substantially sped up the procedure of delimbing trees, power saws are expensive and require frequent repair and replacement. Moreover, the operator of a power saw is easily and frequently injured.

SUMMARY OF THE INVENTION

Briefly described, the present invention comprises a self-propelled tree shear and delimber that is operated by a single person and functions to rapidly fall trees, remove the limbs from the trunk of the tree and sever the trunk into sections. The operation of the apparatus is such that the sections of the trunk are normally piled adjacent one another for easy loading onto a trunk or the like. The tree shear and delimber can be driven up to a standing tree and cut the tree adjacent the ground surface. The fallen tree is then lifted by the shear mechanism into the delimbing mechanism, the limbs are severed from the trunk by the delimbing mechanism, the operation of the delimbing mechanism is periodically interrupted, and the shear mechanism severs the trunk into sections.

Thus, it is an object of this invention to provide a tree shear and delimber which is operable by a single person to rapidly sever, delimb, and sectionalize the trunk of a tree.

Other objects, features and advantages of the present invention will become apparent upon reading the following specification when taken into conjunction with the accompanying drawing.

DESCRIPTION OF THE PREFERRED EMBODIMENTS

Figure 1:
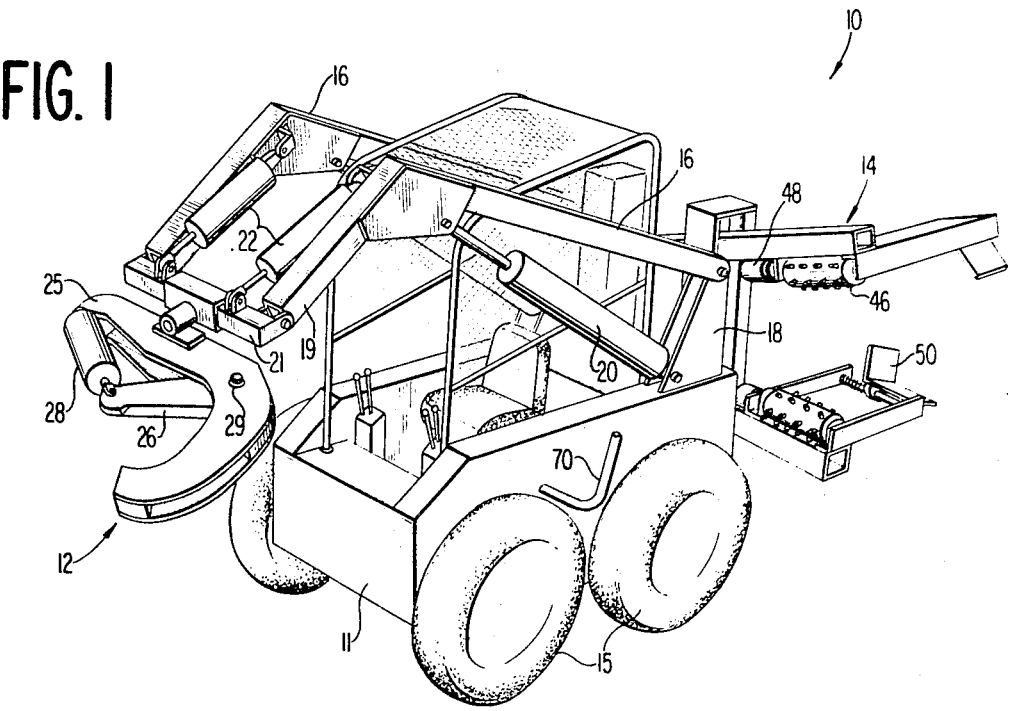
FIG. 1 is a perspective view of the tree shear and delimber apparatus, showing the front and left side of the apparatus.

Referring now in more detail to the drawing, in which like numerals indicate like parts throughout the views, FIG. 1 shows tree shear and delimber 10 which comprises a self-propelled wheeled vehicle 11 having a shear mechanism 12 on its front end and a delimbing mechanism 14 on its rear end. The four wheels 15 of vehicle 11 are nonsteerable power-driven wheels that cause the vehicle to turn in a manner similar to a crawler tractor, wherein the wheels of one side of the vehicle can be driven independently of the wheels on the other side of the vehicle to cause the vehicle to turn or twist.

A pair of moveable support arms 16 are pivotally supported at one of their ends by a pair of support blocks 18. Moveable support arms 16 are bent intermediate their ends in a downward direction so that the lower ends 19 can be pivoted down toward the ground surface. Hydraulic rams 20 extend from the frame of the vehicle up into the crook of the moveable support arms and function to raise or lower the support arms with a pivotal movement about support blocks 18. Connecting bar 21 extends between the ends 19 of support arms 16 and is pivotal with respect thereto under the influence of rams 22.

Shear mechanism 12 comprises a frame 25, cutting blade 26, and ram 28. Blade 26 is pivotal about its pivot pin 29 and is connected to ram 28 and moves under the influence of the ram. Shear mechanism 12 is connected to connecting bar 21 and is moveable from a position where frame 25 extends substantially parallel to ground surface and cutting blade 26 cuts with a horizontal movement, to a position to where frame 25 extends in an upright attitude and cutting blade 26 cuts with a substantially vertical movement. Moveable support arms 16 function to raise or lower shear mechanism 12 to virtually any height within the reach of the support arms. Cutting blade 26 and its pivot pin 29 are located to one side of vehicle 11, and are generally in alignment with the wheels 15 at the side of the vehicle.

With this arrangement, shear mechanism 12 can be oriented to a horizontal attitude and lowered to a position adjacent the ground surface and vehicle 11 can be driven up to a standing tree so that the frame 25 and cutting blade 26 span the trunk of the tree, and ram 28 is actuated to cause cutting blade 26 to sever the tree. Normally, the tree will fall away from and to the side of the vehicle.

Figure 2:
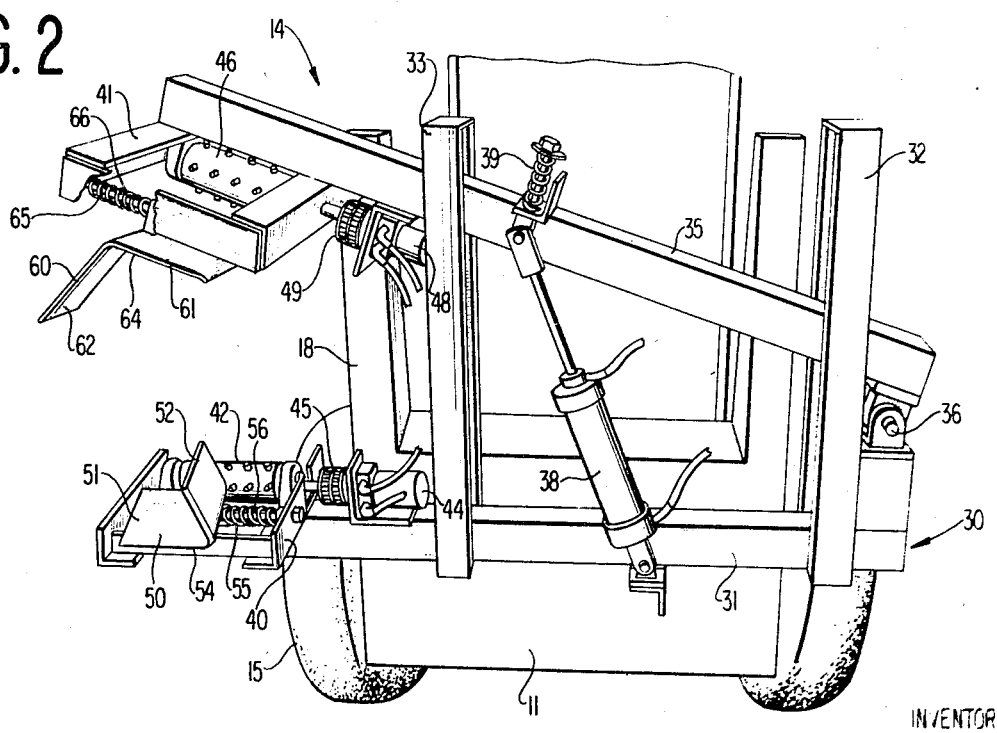
FIG. 2 is a perspective view of the tree shear and delimber apparatus, showing the rear of the apparatus.

As is best shown in FIG. 2, delimbing mechanism 14 comprises framework 30 and includes a lower support beam 31, upright support frames 32 and 33, and moveable support beam 35. Upright support frames 32 and 33 each comprise a pair of upright beams connected at their lower ends to lower support beam 31 and to each other at their upper ends to form a pair of slots through which moveable support beam 35 moves. Moveable support beam 35 is connected at one of its ends to lower support beam 31 by means of pivot pin 36. Ram 38 is connected at its lower end to lower support beam 31 and at its upper end to moveable support beam 35. The connection between ram 38 and moveable support beam 35 is through compression spring and bracket 39 which permits limited movement between moveable support beam 35 and ram 38.

Framework extension 40 is connected to lower support beam 31 at the side of vehicle 11 and extends generally rearwardly of the vehicle. Framework extension 41 is similar to framework extension 40 but is connected to the end of moveable support beam 35 at the same side of vehicle 11. Rotatable tree feeding spindle 42 is connected to framework extension 40 and arranged to rotate about a normally lateral axis. Hydraulic motor 44 drives spindle 42 through chain coupling 45. A similar rotatable tree feeding spindle 46 is rotatably supported by framework extension 41 and arranged to rotate about a normally lateral axis. The hydraulic motor 48 functions to drive spindle 46 through chain coupling 49.

Cutting blade 50 is generally of open or obtuse L-shape and is supported in framework extension 40 and comprises lateral leg 51 and upright leg 52. Cutting blade 50 comprises a sharpened edge 54 that extends generally rearwardly of vehicle 11. Cutting blade 50 is mounted on support shaft 55 in framework extension 40 and is biased by spring 56 in a lateral direction away from the centerline of the vehicle.

Cutting blade 60 is also generally of open or obtuse L-shape and is carried by framework extension 41 and includes lateral leg 61 and downwardly extending leg 62. Its sharpened edge 64 also extends rearwardly of vehicle 11. Cutting blade 60 is mounted on spindle 65 and urged toward the centerline of vehicle 11 by means of compressions spring 66.

Framework extension 41 of moveable support beam 35 is longer than framework extension 40 of lower support beam 31, and its cutting blade 60 is positioned further to the rear of vehicle 11 than cutting blade 50, whereas, rotatable tree-feeding spindles 42 and 46 are positioned generally in vertical alignment with each other between moveable support beam 35 and lower support beam 31. With this arrangement, when moveable support beam 35 is lowered by means of ram 38, rotatable tree-feeding spindle 46 moves down toward rotatable tree feeding spindle 42 and cutting blade 60 moves down behind L-shaped blade 50. Thus, the cutting blades will be aligned with each other to define a space through which the trunk of a tree can be drawn by the spindles. The lateral legs 51 and 61 of the cutting blades usually overlap the upwardly extending leg 52 and downwardly extending leg 62; however, spring 56 and 66 will allow the legs 52 and 62 to move away from each other and spring 39 will allow the legs 51 and 61 to move away from each other.

A supply of hydraulic fluid (not shown) is maintained in vehicle 11, and a pump (not shown) is used to supply hydraulic pressure to the various rams 20, 22, 28, and 38, and to hydraulic motors 44 and 48. The flow of fluid to these various elements is controlled at the operators station by various valves of conventional construction. The control of the hydraulic fluid to motors 44 and 48 is also controlled by a divider valve (not shown) that assures that the fluid flow to these motors is substantially equal.

As is best shown in FIG. 1, support bar 70 is rigidly attached to the side of vehicle 11 and is generally in alignment with and at a level substantially equal to that of L-shaped blade 50 of lower support beam 31. Support bar 70 is bent intermediate its end and extends first outwardly and then upwardly from vehicle 11.

OPERATION

Figure 3:
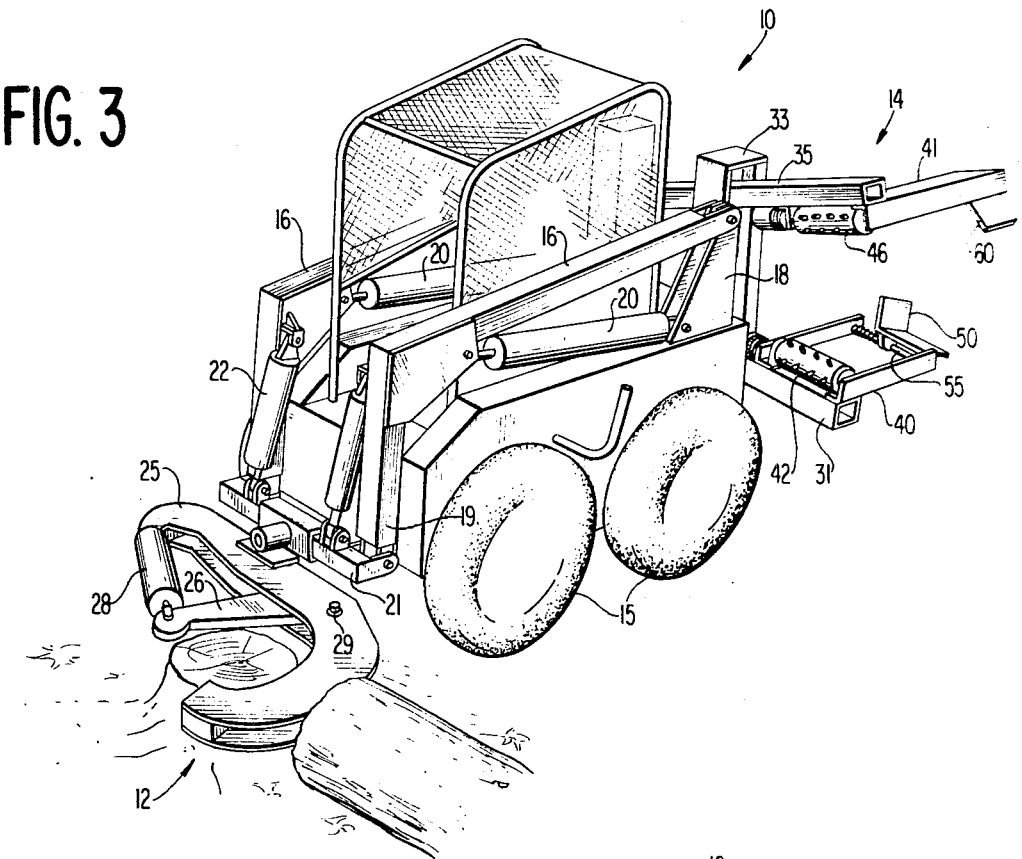
FIGS. 3, 4, 5 and 6 are progressive operational views of the tree shear and delimber apparatus, showing the steps of shearing, delimbing and sectionalizing the trunk of a tree.

As is best shown in the sequence of FIGS. 3, 4, 5, and 6, tree shear and delimber 10 is used to harvest a tree by orienting shear and delimber 10 is used to harvest a tree by orienting shear mechanism 12 to a substantially horizontal attitude by actuating rams 22, and lowering moveable support arms 16 by actuating rams 20 until the shear is approximately at ground level. The self-propelled wheeled vehicle 11 is then driven in a forward direction toward a standing tree until the trunk of the tree is located within the movement or bite of cutting blade 26. Ram 28 is then energized which causes cutting blade 26 to pivot about its pivot pin 29 and shear the tree at its base. Under normal situations, the tree will fall to the left of the vehicle (FIG. 3).

Figure 4:
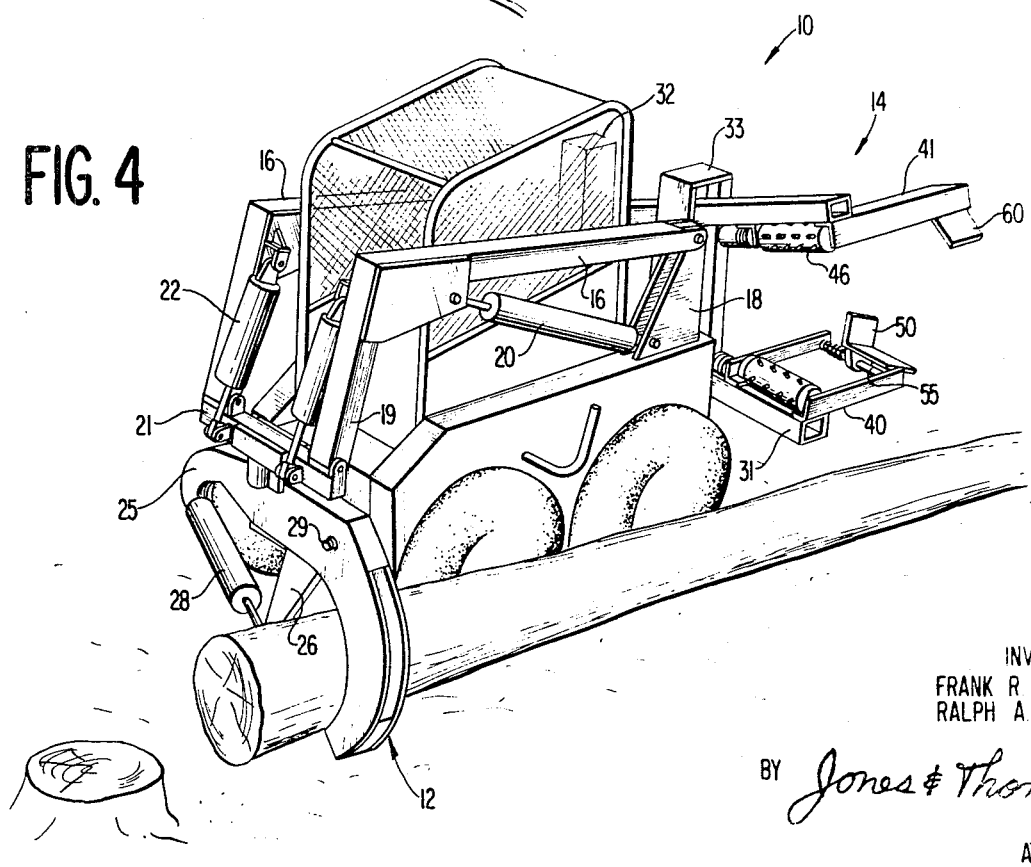
Figure 5:
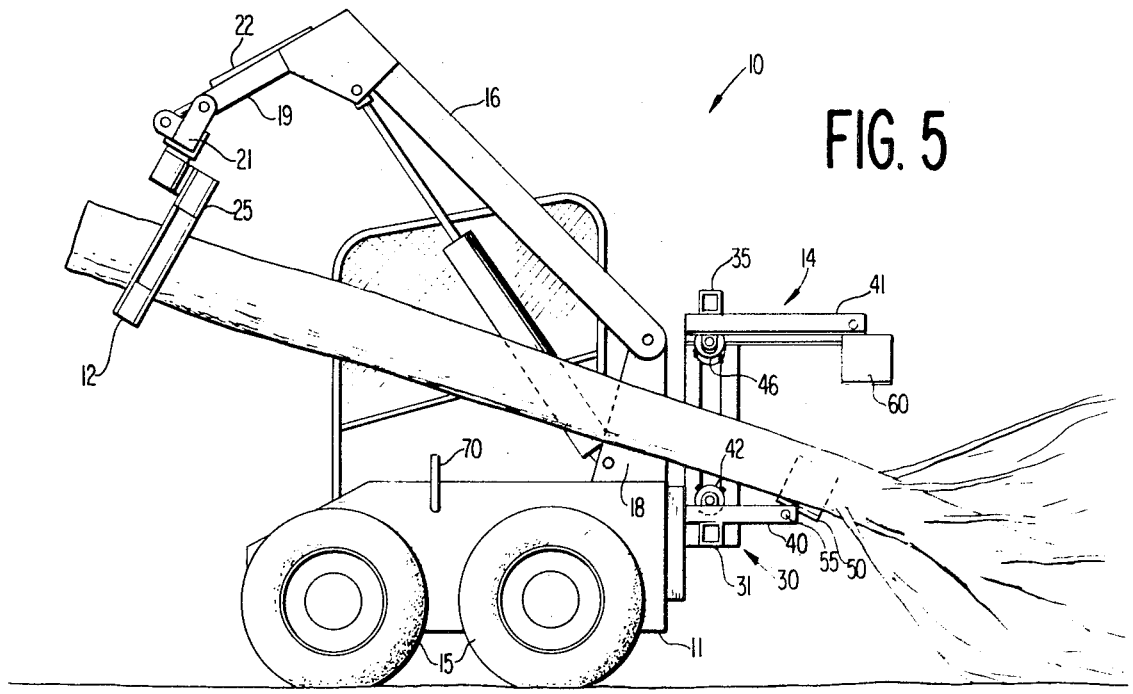
Figure 6:
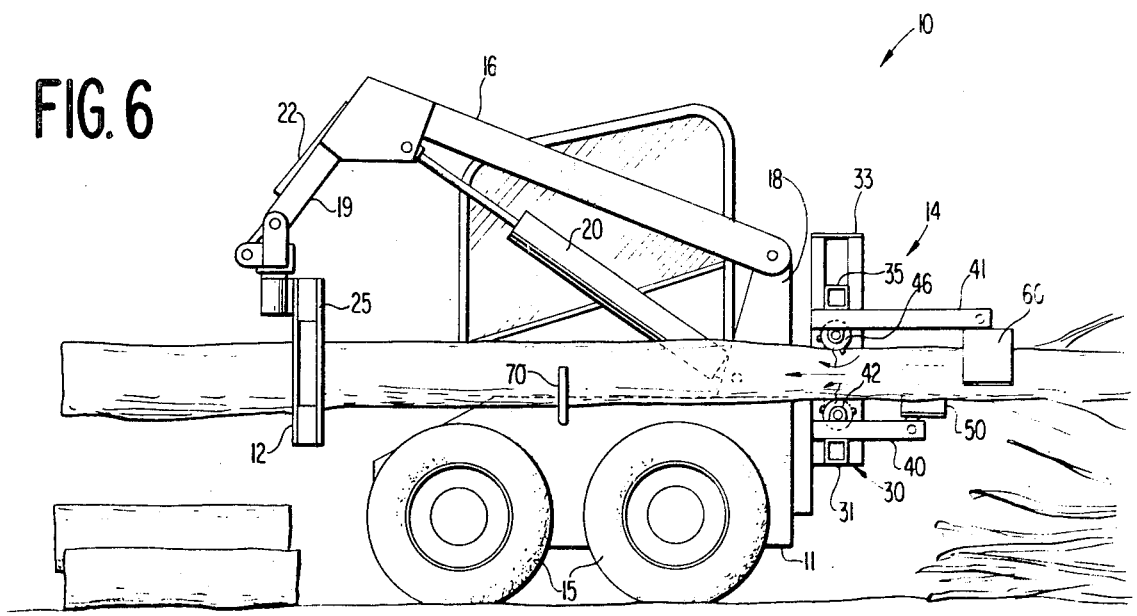

Shear mechanism 12 is then elevated and reoriented so that it extends in a downward or vertical direction. Vehicle 11 is maneuvered so that shear mechanism 12 is above the base of the trunk of the fallen tree, and shear mechanism 12 is lowered about the trunk of the tree and cutting blade 26 moved partially through its cutting stroke to grasp the tree (FIG. 4). The trunk of the tree is then lifted or pivoted about its limbs and foilage by lifting the shear mechanism. The vehicle is then maneuvered so that the trunk of the tree is positioned generally above the wheels 15 on the left of the vehicle, which also happens to be above support bar 70 and cutting blade 50 (FIG. 5). The tree is lowered and released by shear mechanism 12, and moveable support beam 35 is pivoted in a downward direction by ram 38 until rotatable tree-feeding spindle 46 engages the upper side of the tree trunk and causes the tree trunk to assume a substantially horizontal attitude along the side of the vehicle, if the tree has not already assumed such an attitude (FIG. 6). In this position the trunk of the tree is then engaged by both tree feeding spindles 42 and 46. The downward movement of moveable support beam 35 also causes L-shaped cutting blade 60 to engage the top and side surfaces of the trunk of the tree. The upwardly extending leg 52 of cutting blade 50 and the downwardly extending leg 62 of cutting blade 60 causes the trunk of the tree to be confined within the aligned cutting blades 50 and 60.

When hydraulic motors 44 and 48 are energized, the tree-feeding spindles 42 and 46 rotate to urge or draw the trunk of the tree along the side of the vehicle, through the substantially aligned cutting blades 50 and 60 and through support bar 70 over the wheels 15 on the left side of the vehicle. As the trunk of the tree is drawn through cutting blades 50 and 60, the sharpened rearwardly facing edges of the cutting blades function to cut away the limbs and branches of the tree. In the meantime, shear mechanism 12 is oriented so that the bite of its cutting blade is in alignment with the movement of the trunk of the tree along the side of the vehicle. When the tree has been urged a predetermined distance along the side of the vehicle by tree feeding spindles 42 and 46, the operator will periodically interrupt the operation of hydraulic motors 44 and 48 to stop the feeding of the tree to the cutting blades and will operate cutting blade 26 to sever the delimbed trunk into sections. As the sections are separated from the body of the tree trunk, they tend to fall in front of and to the side of vehicle 11, and normally fall in a cluster with the sections being generally parallel to each other.

Since the lateral legs 51 and 61 are urged toward each other by spring 39, and since downwardly extending leg 62 and upwardly extending leg 52 are urged toward each other by springs 66 and 56, when a tree trunk is placed between the blades that is larger than the smallest space defined between the blades or when a lump or protrusion in the trunk of the tree is encountered by the blades, the blades will be wedged apart against the bias of the springs. The blade legs are angled so that their shapes are substantially as an opened or obtuse L-shape, so that as the cutting blade 60 of moveable support beam 35 is moved down over and into surrounding relationship with respect to the tree trunk, the blades will ride over the curvature of the trunk, and the trunk will wedge the blades apart. Moreover, the cutting blades are each angled so as to define a larger space at their cutting edges than at their rear edges and as the tree trunk is fed through the cutting blades, the shape of the blades will accommodate any normal enlargements or irregularities on the surface of the tree, yet the springs 39, 56 and 66 will cause the space between the blades to grow smaller as the trunk of the tree becomes smaller.

Since the cutting blades 50 and 60 are not moved directly toward each other, but are moved generally in alignment with each other, their legs can overlap each other; that is, upwardly extending leg 52 of blade 50 can overlap lateral leg 61 of blade 60 and vice versa. This allows delimbing mechanism 14 to accommodate both large and small diameter tree trunks, and the structure is such that the blades automatically accommodate any sized tree trunk within its capacity.

While both cutting blades 50 and 60 have been disclosed as biased by springs 56 and 66, it should be obvious that only one of the blades can be spring biased, and while this invention has been described in detail with particular reference to a preferred embodiment thereof, it will be understood that other variations and modifications can be effected within the spirit and scope of the invention.

We claim:

1. In combination with a mobile vehicle with a shear for cutting standing trees or the like at one end and a tree delimber at the other end, said tree delimber comprising first support means carrying a rotatable tree feeding spindle and a generally L-shaped cutting blade with a laterally extending leg and an upwardly extending leg, a second support means moveable toward and away from said first support means and carrying a rotatable tree feeding spindle and a generally L-shaped cutting blade with a laterally extending leg and a downwardly extending leg, the cutting blade of said second support means being moveable with its support means generally in alignment with the cutting blade of said first support means into surrounding relationship with respect to the trunk of a tree or the like, and the rotatable tree-feeding spindle of said second support means being moveable with its support means to a position to urge the trunk of a tree or the like into engagement with the tree-feeding spindle of said first support means, whereby the tree-feeding spindles rotate to urge the tree through the space surrounded by the cutting blades toward said shear and the limbs of the tree are cut away by the cutting blades, said shear being moveable to a position in alignment with the movement of a tree through the cutting blades for cutting the tree in sections.

2. The invention of claim 1 and wherein the cutting blade of said first support means has its laterally extending leg extending away from the centerline of said vehicle and the cutting blade of said second support means has its laterally extending leg extending toward the centerline of said vehicle.

3. The invention of claim 1 and wherein at least one of the cutting blades is biased in a lateral direction into surrounding relationship with respect to the trunk of a tree or the like when generally aligned with other of the L-shaped cutting blades.

4. A tree delimber for attachment to one end of a mobile vehicle having a tree shear or the like at its other end, said tree delimber comprising a first support member carrying a first tree feeding spindle member rotatable about a normally laterally extending axis and having its upper surface exposed, a first generally obtuse L-shaped cutting member carried by said first support member at approximately the same level as the upper surface of said first spindle member, said cutting member having one of its legs extending in a lateral direction substantially parallel to the axis of rotation of said first spindle member and the other of its legs extending in an upward direction, said first cutting member being positioned in alignment with the direction of rotation of said first spindle member, a second support member carrying a second tree-feeding spindle rotatable about a normally laterally extending axis and having its lower surface exposed, a second generally obtuse L-shaped cutting member carried by said second support member at approximately the same level as the lower surface of said second spindle member, said first and second support members being moveable with respect to each other to position said first and second spindle members adjacent each other to engage a tree trunk or the like on opposite sides thereof and to position said first and second cutting members generally in alignment with each other to generally surround the tree trunk, and spring means for biasing said first and second cutting members laterally into engagement with the tree trunk.

5. The invention of claim 4 and wherein said second support member comprises a support beam pivotal at one of its end about a lateral axis and carrying said second L-shaped cutting member and said second spindle at its other end, and further comprising fluid-actuated power means for pivoting said second support member toward and away from said first support member.

6. The invention of claim 5 and further comprising spring means connected to said second support member and to said fluid-actuated power means for permitting movement of said second support means with respect to said fluid-actuated power means.

7. The invention of claim 4 and further comprising a support member spaced from and at substantially the same level as said first spindle for supporting the trunk of a tree in a substantially horizontal altitude.

8. Apparatus for harvesting trees or the like comprising a self-contained wheeled mobile vehicle, power-operated severing means extending from the front portion of said vehicle and pivotally mounted on a normally horizontal axis for severing a standing tree with a horizontal cut at at the front portion of the vehicle and for severing a fallen tree into sections with a vertical cut, power-operated clamping means mounted on the other end of said vehicle and comprising a pair of generally obtuse L-shaped cutting blades movable into surrounding relationship with respect to the trunk of a tree, spring means for biasing said cutting blades toward the trunk of the tree, and power-operated driving means for urging the trunk of the tree through said cutting blades and toward said severing means so that the limbs of the tree are removed from the trunk by said cutting blades and the delimbed trunk moves through said severing means at the front portion of said vehicle and is cut into sections by said severing means.

* * * * *